(12) United States Patent
Zhang et al.

(10) Patent No.: US 11,243,992 B2
(45) Date of Patent: Feb. 8, 2022

(54) SYSTEM AND METHOD FOR INFORMATION RECOMMENDATION

(71) Applicant: HITHINK FINANCIAL SERVICES INC., Chicago, IL (US)

(72) Inventors: Haihong Zhang, Hangzhou (CN); Zhiwei Tao, Hangzhou (CN)

(73) Assignee: HITHINK FINANCIAL SERVICES INC., Chicago, IL (US)

( * ) Notice: Subject to any disclaimer, the term of this patent is extended or adjusted under 35 U.S.C. 154(b) by 114 days.

(21) Appl. No.: 16/329,259

(22) PCT Filed: Sep. 2, 2016

(86) PCT No.: PCT/CN2016/097944
§ 371 (c)(1),
(2) Date: Feb. 28, 2019

(87) PCT Pub. No.: WO2018/040069
PCT Pub. Date: Mar. 8, 2018

(65) Prior Publication Data

US 2019/0213194 A1 Jul. 11, 2019

(51) Int. Cl.
*G06F 16/335* (2019.01)
*G06F 16/00* (2019.01)
(Continued)

(52) U.S. Cl.
CPC ............ *G06F 16/335* (2019.01); *G06F 16/00* (2019.01); *G06F 16/24578* (2019.01);
(Continued)

(58) Field of Classification Search
CPC .. G06F 16/24578; G06F 40/20; G06F 40/205; G06F 16/00; G06F 16/9535; G06F 16/951; G06F 16/33; G06N 20/00
See application file for complete search history.

(56) References Cited

U.S. PATENT DOCUMENTS

2003/0135445 A1* 7/2003 Herz ............... G06Q 40/06
705/37
2011/0238730 A1* 9/2011 Zhu ................ H04L 67/42
709/203
(Continued)

FOREIGN PATENT DOCUMENTS

CN 102354385 A 2/2012
CN 103208080 A 7/2013
(Continued)

OTHER PUBLICATIONS

Sun et al., "A novel stock recommendation system using Guba sentiment analysis", Personal and Ubiquitous Computing, vol. 22, Issue 3, pp. 575-587 (Year: 2018).*
(Continued)

*Primary Examiner* — Mark D Featherstone
*Assistant Examiner* — Kweku William Halm
(74) *Attorney, Agent, or Firm* — Metis IP LLC

(57) ABSTRACT

The disclosure relates to information recommendation systems and methods. The information recommendation methods may include: obtaining information selected by a user or information retrieved by the user; analyzing the selected information or the retrieval information; determining a retrieval path based on a result of analyzing the selected information or the retrieval information; retrieving other information related to the selected information based on the retrieval path; and recommend the other information to the user. The information recommendation systems may include a computer-readable storage medium; codes stored in the computer-readable storage medium; and a processor; when executing the codes, the processor may perform the above-mentioned information recommendation methods.

16 Claims, 6 Drawing Sheets

(51) Int. Cl.
*G06F 40/20* (2020.01)
*G06F 40/205* (2020.01)
*G06N 20/00* (2019.01)
*G06F 16/9535* (2019.01)
*G06F 16/2457* (2019.01)
*G06F 16/951* (2019.01)

(52) U.S. Cl.
CPC ........ *G06F 16/951* (2019.01); *G06F 16/9535* (2019.01); *G06F 40/20* (2020.01); *G06F 40/205* (2020.01); *G06N 20/00* (2019.01)

(56) References Cited

U.S. PATENT DOCUMENTS

| | | | | |
|---|---|---|---|---|
| 2011/0246267 | A1* | 10/2011 | Williams | G06Q 30/08 705/14.4 |
| 2012/0310926 | A1* | 12/2012 | Gannu | G06F 16/24578 707/723 |
| 2014/0108431 | A1 | 4/2014 | Zhu et al. | |
| 2016/0125048 | A1* | 5/2016 | Hamada | G06F 16/24578 707/734 |
| 2016/0267117 | A1* | 9/2016 | Guggilla | G06F 16/2455 |
| 2017/0161758 | A1* | 6/2017 | Towriss | G06N 20/00 |
| 2018/0032997 | A1* | 2/2018 | Gordon | G06Q 30/0269 |
| 2020/0005341 | A1* | 1/2020 | Marsh | G06Q 40/00 |

FOREIGN PATENT DOCUMENTS

| | | |
|---|---|---|
| CN | 104036045 A | 9/2014 |
| CN | 104598538 A | 5/2015 |
| CN | 105589936 A | 5/2016 |
| WO | 2014142456 A1 | 9/2014 |

OTHER PUBLICATIONS

Brammert et al., "Limits and Opportunities of Big Data For Macro-Prudential Modeling of Financial Systemic Risk", p. 1-6 (Year: 2014).*
International Search Report in PCT/CN2016/097944 dated May 31, 2017, 6 pages.

* cited by examiner

SYSTEM AND METHOD FOR INFORMATION RECOMMENDATION

CROSS-REFERENCE TO RELATED APPLICATIONS

This application is a U.S. national stage under 35 U.S.C. § 371 of International Application No. PCT/CN2016/097944, filed on Sep. 2, 2016, designating the United States of America, the entire contents of which are hereby incorporated by reference.

TECHNICAL FIELD

The present disclosure relates to systems and methods for information recommendation, and more particularly to systems and methods for recommending related products or information to a user based on a user's record and relationship between user's demand and the information to be recommended.

BACKGROUND

With the development of computers. Internet technologies and information technologies, more and more users begin shopping, reading books, listening to music, socializing, traveling, securities trading and other activities through networks and software (e.g., e-commerce). A variety of communication devices, such as smart phones and personal digital assistants (PDAs), may be widely used to meet user's demand for real-time information. The information service provider may receive information actively retrieved by the user via his/her terminal through a large computing device, a database, a communication network system, and the like. The information service provider may also recommend a related product and information to the user based on the retrieved information.

In addition, the service provider may actively recommend a product to the user. Taking stocks in securities trading as an example, most users may be investors with relatively little financial expertise or little investment experience. In order to enable the user to get a suitable stock, obtain expected benefits and/or avoid unnecessary loss, the service provider may need to give an accurate and practical recommendation to the user. Current stock recommendation methods mainly include stock price forecast based on artificial mathematical analysis, online stock recommendation based on stock evaluation, or the like. However, these methods are generic methods for public, and may not meet the individual needs of different users. Therefore, how to recommend an investment strategy that matches the user's preferences has become increasingly important in the field of stock recommendation.

SUMMARY

According to an aspect of the present disclosure, a method for information recommendation is provided. The method may include obtaining information selected by a user or information retrieved by the user; and analyzing the selected information or the retrieved information. The method may also include determining a retrieval path based on a result of analyzing the selected information or the retrieved information; retrieving other information related to the selected information based on the retrieval path; and recommending the other information to the user.

According to another aspect of the present disclosure, a system for information recommendation is provided. The system may include a computer-readable storage medium, codes stored in the computer-readable storage medium, and a processor. When executing the code, the processor may perform the following operations, including; obtaining information selected by a user or information retrieved by the user; analyzing the selected information or the retrieved information; determining a retrieval path based on a result of analyzing the selected information or the retrieved information; retrieving other information related to the selected information based on the retrieval path; and recommending the other information to the user.

In some embodiments, securities information selected by the user may include at least one of securities information held by the user, securities information sold by the user, securities information of interest to the user, securities information collected by the user, or securities information that is used by the user to simulate an operation.

In some embodiments, analyzing the selected information or the retrieved information may further include determining whether the selected information or the retrieved information is natural language, and in response to a determination that the selected information or the retrieved information is natural language, analyzing the natural language.

In some embodiments, analyzing the selected information or the retrieved information may include at least one of classifying the information, extracting a keyword, determining a priority, or assigning a weight.

In some embodiments, the retrieval path may include one or more paths. Each path may include one or more layers of retrieval algorithms.

In some embodiments, retrieving the other information related to the selected information based on the retrieval path may further include: determining an evaluation value according to the other information; comparing the evaluation value with a threshold; and in response to a determination that the evaluation value is not less than the threshold, selecting the other information.

In some embodiments, recommending the other information to the user may further include classifying the other information, and sending at least one portion of a classification result to the user.

In some embodiments, the other information may be further predicted or back-tested.

In some embodiments, a machine training may be performed on the retrieval path. A result of the machine training may be stored in the system for later use.

In some embodiments, the information recommendation system may further include a terminal, configured to: send the information selected by the user or the information retrieved by the user to the information recommendation system, and receive the other information recommended by the system according to the information selected by the user or the information retrieved by the user.

BRIEF DESCRIPTION OF THE DRAWINGS

The present disclosure is further described in terms of exemplary embodiments. The drawings in the following description are only some of the embodiments of the present disclosure, and are not intended to limit the present disclosure. Unless stated otherwise or obvious from the context, the same reference numeral in the drawings refers to the same structure and operation.

DETAILED DESCRIPTION

As used in the description and the claims, the singular forms "a", "an", and "the" include plural referents unless the content clearly dictates otherwise. It will be further understood that the terms "comprises", "comprising", "includes", and/or "including" when used in the disclosure, specify the presence of stated steps and elements, but do not preclude the presence or addition of one or more other steps and elements.

Although the present disclosure makes various references to certain devices, engines, modules, units, and/or sub-units in a system according to embodiments of the present disclosure, any number of different devices, modules, units, and/or sub-units may be used and operated on a terminal and/or server. The devices, modules, units and/or sub-units are merely illustrative, and different aspects of the systems and methods may use different devices, modules, units and/or sub-units. In addition, terms such as "system", "device", "engine", "module", "unit", and/or "sub-unit" are only used to describe the disclosure for convenience, the functions, structures, sizes, and categories that these terms represent may not have absolute restrictions, and in other cases, these terms may be interchangeable.

Figure 1:
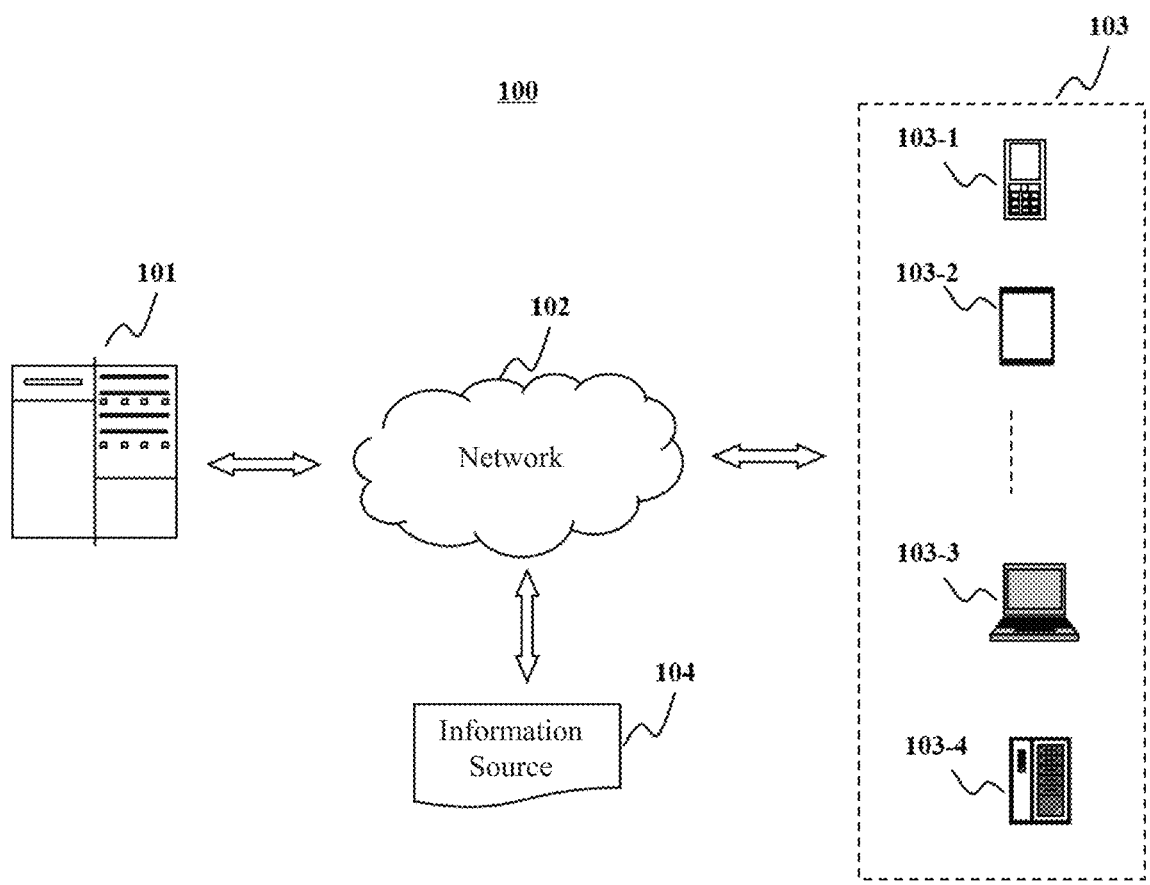
FIG. 1 is a schematic diagram of an information service system according to some embodiments of the present disclosure.

FIG. 1 is a schematic diagram of an information service system according to some embodiments of the present disclosure. As shown in FIG. 1, the information service system 100 may include, but is not limited to, a server 101, a network 102, a terminal 103, and an information source 104. The server 101 may perform information collection, information processing, and information interaction. The network 102 may provide a channel for information transfer and exchange. The terminal 103 may provide an entry for user interaction. The information source 104 may provide a plurality of information items. In the information service system 100, the information exchange among the server 101, the terminal 103, and the information source 104 may be implemented via the network 102.

In some embodiments, the server 101 may be a single server or a server group. The server group may be centralized, for example, a data center. The server group may be distributed, for example, a distributed system. The server 101 may be local or remote, for example, a cloud server. The server 101 may include a web server, a file server, a database server, an FTP server, an application server, a proxy server, a mail server, or the like, or any combination thereof. In some embodiments, the server 101 may perform an information recommendation function. For example, the server 101 may collect information and analyze the information. The server 101 may further determine a retrieval strategy of a product based on a result of analyzing the information. The server 101 may further retrieve and recommend related product(s) according to the retrieval strategy.

In some embodiments, the network 102 may include a wired network or a wireless network. The network 102 may be a single network or a combination of networks. The network 102 may include, but is not limited to, a local area network (LAN), a wide area network (WAN), a public network, a private network, a wireless local area network (WLAN), a virtual network, a metropolitan area network (MAN), a public switched telephone network (PSTN), or the like, or any combination thereof. The network 102 may provide wired or wireless access points, base stations, or network exchange points, via which the terminal 103 and the information source 104 may be connected to the network 102 for information exchange.

In some embodiments, the terminal 103 may include a cell phone, a personal computer, a tablet, or the like, or any combination thereof. In some embodiments, the terminal 103 may include a smart home device, a wearable device, a smart mobile device, or other smart devices. The smart home device may include, but is not limited to, a smart lighting device, a smart electrical control device, a smart monitor device, a smart television, a smart camera, a smart phone, a walkie-talkie, or the like, or any combination thereof. The wearable device may include, but is not limited to, a smart bracelet, a smart watch, a smart footwear, smart glasses, a smart helmet, a smart headband, a smart clothing, a smart backpack, a smart accessory, or the like, or any combination thereof; The smart mobile device may include, but is not limited to, a built-in device (an onboard computer or an onboard TV, etc.) of a vehicle, a gaming device, a global positioning system (GPS) device, a point of sale (POS) device, or the like, or any combination thereof. In some embodiments, the terminal 103 may input information by a user or display information to the user. For example, the terminal 103 may input, by the user, user information, information retrieved by the user, or product information selected by the user. The user information, the information retrieved by the user, or the product information selected by the user may be found elsewhere in the present disclosure, and referred to the related description of the present disclosure. As another example, the terminal 103 may display information transmitted by the server 101, such as displaying product recommendation information, and the like.

In some embodiments, the information source 104 may generally include information other than the information provided by the terminal 103. The information source 104 may include, but is not limited to, various information sources that may provide information, such as a shopping website, a portal, a stock exchange, a microblog, a blog, a personal website, a library, and the like. The information source 104 may exist in a form of a single database, or in a form of a plurality of databases connected by a network, or in a form of a plurality of personal devices. When the information sources exist in the form of a plurality of personal devices, the personal devices may generate content (e.g., also referred to as "user-generated content"), for example, by uploading text, voice, image, and video to a cloud server. The plurality of personal devices and the cloud server may constitute the information sources. In some embodiments, the information source 104 may provide some related information, including but not limited to securities news, market analysis, social hotspots, financial perspectives, market analysis, industry research reports, company announcements, investment opportunities, funds, commodities, Hong Kong stocks, US stocks, or the like, or any combination thereof.

Figure 2:
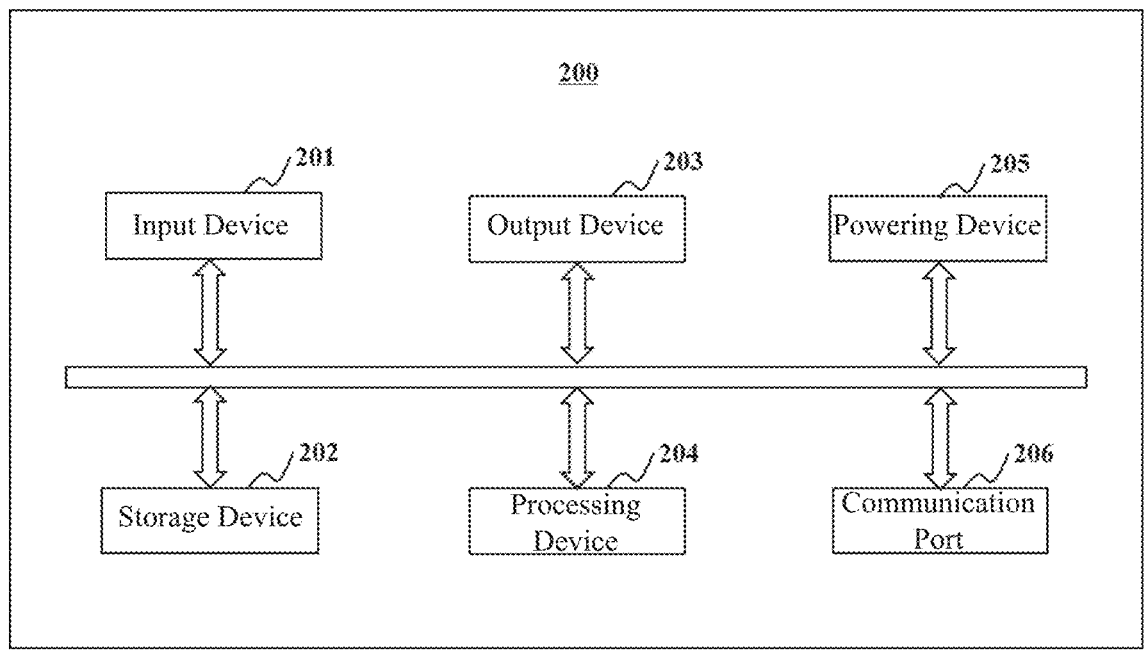
FIG. 2 is a schematic diagram of an architecture of a server device according to some embodiments of the present disclosure.

FIG. 2 illustrates an architecture of an exemplary server device according to some embodiments of the present disclosure. The server device may be configured to implement a specific system (e.g., the server 101) disclosed in the present disclosure. The specific system of the present disclosure may use a functional block diagram to explain a hardware platform containing a user interface. The server may be a computer with a specific user, a computer with multiple users, a computer group, or the like. For convenience, only one server is depicted in FIG. 2, but the related computer functions that provide the information needed for information recommendation may be implemented in a distributed fashion on a set of similar platforms, to distribute the processing load of the system 100. As shown in FIG. 2, the server 101 may include one or more input devices 201, one or more storage devices 202, one or more output devices 203, one or more processing devices 204, one or more powering devices 205, and one or more communication ports 206.

In some embodiments, the input device 201 may implement information input of the terminal 103 to the server 101. The input device 201 may be a device that can input any information or data such as a digit, a character, an instruction, a pressure, a sound, an image, a system, a software, a program, and the like. The input device 201 may include but is not limited to a display, a keyboard, a mouse, a touch pad, a camera, a microphone, a scanner, a light pen, a sensor, or the like, or any combination thereof. The sensor may include, but is not limited to, an acoustic sensor, an odour sensor, a gas sensor, an image sensor, a temperature sensor, a humidity sensor, a pressure sensor, an electromagnetic wave sensor, a speed sensor, an acceleration sensor, or the like, or any combination thereof. In some embodiments, the input device 201 may input, by the user, user information, information retrieved by the user, or product information selected by the user, and the like. The user information, the information retrieved by the user, or the product information selected by the user may be found elsewhere in the present disclosure and referred to the related description of the present disclosure.

In some embodiments, the storage device 202 may be any component having a storage function. The storage device 202 may be configured to store related information (e.g., systems, software, programs, images, sounds, characters, instructions, digits, etc.). In some embodiments, the storage device 202 may store computer program instructions and data of controlling the server 101, for example, implementing one or more functions of the server 101 disclosed herein. In some embodiments, the storage device 202 may store information (e.g., the user information, the information retrieved by the user, or the product information selected by the user, and the like) inputted by the input device 201 and/or information (e.g., the retrieval strategy, the product recommendation information, etc.) generated by the processing device 204.

The storage device 202 may be internal to the server 101. Alternatively, the storage device 202 may be external to the server 101 (e.g., connected via the communication device 205). The storage device 202 may include a main storage device, an auxiliary storage device, a cache memory, a control storage device, and the like. The storage device 202 may be local or remote (e.g., network or cloud). The storage device 202 may store the information directly. Alternatively, the storage device 202 may digitize the information and store the information in a storage device by an electrical, magnetic or optical mode. The storage device 202 may be a device that stores information using electric energy, such as various storage devices, a random access memory (RAM), a read only memory (ROM), and the like. The RAM may include, but is not limited to, a decatron, a selectron, a delay line memory, a Williams tube, a dynamic random access memory (DRAM), a static random access memory (SRAM), a thyristor random access memory (T-RAM), a zero capacitor random access memory (Z-RAM), or the like, or any combination thereof. The ROM may include, but is not limited to, a magnetic bubble memory, a magnetic button line memory, a thin film memory, a magnetic plate line memory, a magnetic core memory, a magnetic drum memory, an optical disk drive, a hard disk, a magnetic tape, a phase change memory, a magnetoresistive random access memory, a ferroelectric random access memory, a nonvolatile SRAM, a flash memory, an electronic erasable rewritable read only memory, an erasable programmable read only memory, a programmable read only memory, a shielded heap read memory, a floating connection gate random memory, a nano-random access memory, a track memory, a variable resistance memory, a programmable metallization unit, or the like, or any combination thereof. The storage device 202 may be a device that stores information using magnetic energy, such as a hard disk, a floppy disk, a magnetic tape, a magnetic core memory, a magnetic bubble memory, a USB flash drive, a flash memory, or the like. The storage device 202 may be a device that stores information using optical energy, such as a CD, a DVD, or the like. The storage device 202 may be a device that stores information using a magneto-optical mode, such as a magneto-optical disk, or the like. The access mode of the storage device 202 may be random storage, serial access storage, read-only storage, or the like, or any combination thereof. The storage device 202 may be a volatile memory or a nonvolatile memory. The storage devices mentioned above are examples, and the storage device that the server 101 may use is not limited thereto.

In some embodiments, the output device 203 may be configured to output information in the server 101 via a certain form. The form of outputting information by the server 101 may include, but is not limited to, digit, character, instruction, pressure, sound, image, system, software, program, or the like, or any combination thereof. In some embodiments, the output device 203 may include, but is not limited to, a display, a printer, a plotter, an image output device, a language output device, or the like, or any combination thereof. The outputted information may or may not be sent to the server 101. The outputting information that is not sent may be stored in the storage device 202 or deleted.

In some embodiments, the processing device 204 may be configured to process information. The processing of information may include, but is not limited to, storing, classifying, filtering, converting, calculating, retrieving, predicting, training, or the like, or any combination thereof. In some embodiments, the processing device 204 may analyze the information (e.g., analyzing natural language, etc.), determine a retrieval path, recommend related products, and the like. In some embodiments, the processing device 204 may also be configured to process instructions, perform operations, control time, and the like. The processing device 204 may further include logic components, register components, control components (not shown in FIG. 2), and the like. In some embodiments, the processing device 204 may include, but is not limited to, a Central Processing Unit (CPU), an Application Specific Integrated Circuit (ASIC), an Application Specific Instruction Set Processor (ASIP), a Physics Processing Unit (PPC), a Digital Processing Processor (DSP), a Field-Programmable Gate Array (FPGA), a Programmable Logic Device (PLD), a processor, a microprocessor, a controller, a microcontroller, or the like, or any combination thereof.

In some embodiments, the powering device 205 may be configured to provide power to the server 101. The communication port 206 may be connected to an internal or external device of the server 101 in a certain communication mode (such as the network 102). The external device may include the server 101, the information source 104, the cloud, the Internet of things (IOT), and the like. The network 102 may be a single network or a combination of multiple networks. The network 102 may include, but is not limited to, a local area network (LAN), a wireless local area network (WLAN), a metropolitan area network (MAN), and a wide area network (WAN), a public network, a private network, a virtual network, or the like, or any combination thereof.

It should be noted that the storage device 202 and/or the processing device 204 may actually exist in the system, or may perform corresponding functions through a cloud computing platform. The cloud computing platform may include, but is not limited to, a data storing-based storage cloud platform, a data processing-based computing cloud platform, an integrated cloud computing platform of data storing and processing, or the like. The cloud platform used by the server 101 may be a public cloud, a private cloud, a community cloud, a hybrid cloud, or the like. For example, according to actual needs, a portion of information received by the server 101 may be calculated and/or stored by the cloud platform. The other information may be calculated and/or stored by local processing device 204 and/or storage device 202.

Figure 3:
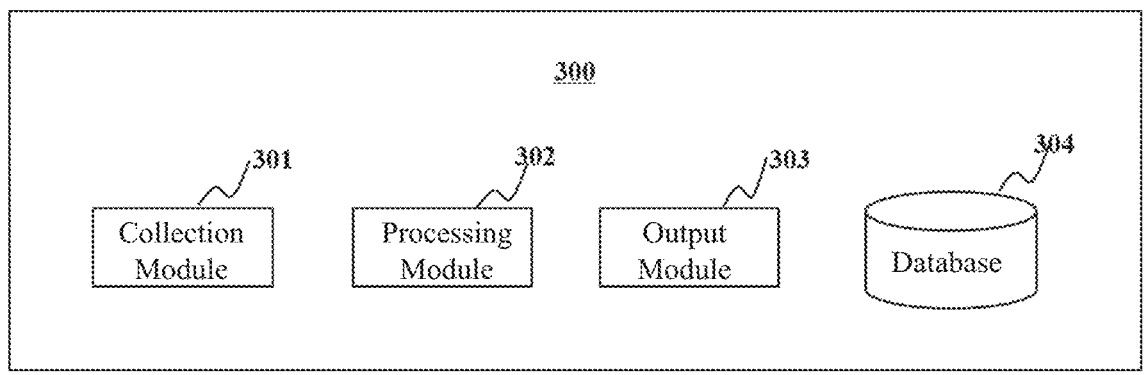
FIG. 3 is a schematic diagram of an information recommendation engine according to some embodiments of the present disclosure.

FIG. 3 is a schematic diagram of an information recommendation engine 300 according to some embodiments of the present disclosure. Each module in the information recommendation engine 300 may be executed by the hardware platform of the server 101. The server 101 may be configured to implement any unit of the information recommendation engine 300 shown in FIG. 3. For example, the information recommendation engine 300 may be implemented by a computer, such as the server 101, via its hardware devices, software programs, firmware, and any combination thereof. As shown in FIG. 3, the information recommendation engine 300 may include a collection module 301, a processing module 302, an output module 303, and a database 304.

The collection module 301 may be configured to obtain information from the terminal 103, the information source 104, or other modules in the information recommendation engine 300. In some embodiments, the information collection functions of the collection module 301 may be performed by the input device 201 in FIG. 2. The type of information obtained by the information recommendation engine 300 through the collection module 301 may include, but is not limited to, a digit, a character, an instruction, a pressure, a sound, an image, a system, a software, a program, or the like, or any combination thereof. In some embodiments, the information that the information recommendation engine 300 may need to collect may include the user information, the information retrieved by the user, the products selected by the user, the other related information, or the like, or any combination thereof. The user information may include, but is not limited to, user's name, nickname, gender, age, contact information, address, historical order(s), returned order(s), historical comment(s), a membership level, a credit rating, a purchasing power, coupon(s), balance, or the like, or any combination thereof. The information retrieved by the user may include, but is not limited to, any text, symbol, sound, picture, video, and the like, that is actively inputted or passively selected by the user in a retrieval box. In some embodiments, the information retrieved by the user may also include a habit that is summarized or learned based on the historical information retrieved by the user, such as hobbies or preferences. The products selected by the user may include, but is not limited to, product(s) purchased by the user, product(s) to be purchased by the user, product(s) collected by the user, product(s) returned by the user, or the like, or any combination thereof. Information related to the product including, but not limited to, product's name, size, model, manufacturer, color, material, evaluation, profit and loss, or the like, or any combination thereof, may be collected. The other related information may include, but is not limited to, news, information, quote, advertisement, report, policies, law, or the like, or any combination thereof, related to the product.

For the convenience of understanding the present disclosure, a stock recommendation in the information recommendation may be described as an example. In the stock recommendation scenario, among the information obtained by the collection module 301, the user information may include, but is not limited to, user's name, nickname, gender, age, profile, time of entry, profit and loss, shareholding, fund, commission broker, or the like, or any combination thereof. The information retrieved by the user may include, but is not limited to, information inputted by the user, such as any text, symbol, sound, pressure, picture, video, and the like. Taking the text as an example, the text may include code, name, industry, turnover rate, amplitude and other information of the stock. The information retrieved by the user may also include information, such as a stock picking record, a browsing history, or retrieval habits formed based on the user's retrieval record(s). The products selected by the user may include stocks (optional stocks) purchased by the user, stocks sold by the user, stocks collected by the user, and the like. Information related to these stocks, including code, name, block, current price, bid price, offer price, amount of increase, growth rate, industry, large order amount, circulation market value, favorable rate, success rate, company summary, company important events, related news, company shareholder information, or the like, or any combination thereof, may be collected. The other information may include, but is not limited to, securities news, market analysis, social hotspots, financial opinions, market analysis, industry research reports, company announcements, investment opportunities, funds, commodities, Hong Kong stocks, US stocks, and the like, or any combination thereof.

In some embodiments, the processing module 302 may be configured to process information obtained from the collection module 301. A processing process may include, but is not limited to, storing, classifying, filtering, converting, analyzing, retrieving, predicting, training, or the like, or any combination thereof. Functions of the processing module 302 may be performed by the processing device 204 in the server 101. In the stock recommendation scenario, the processing module 302 may analyze the information related to an optional stock obtained by the collection module 301, and then retrieve related stock(s) according to the corresponding strategy. In some embodiments, the output module 303 may be configured to output information processed by the processing module 302. Functions of the output module 303 may be performed by an output device in the server 101. In some embodiments, the database 304 may be configured to store information obtained by the external and/or the information recommendation engine 300. Functions of the database 304 may be performed by the storage device 202 in the server 101.

Figure 4:
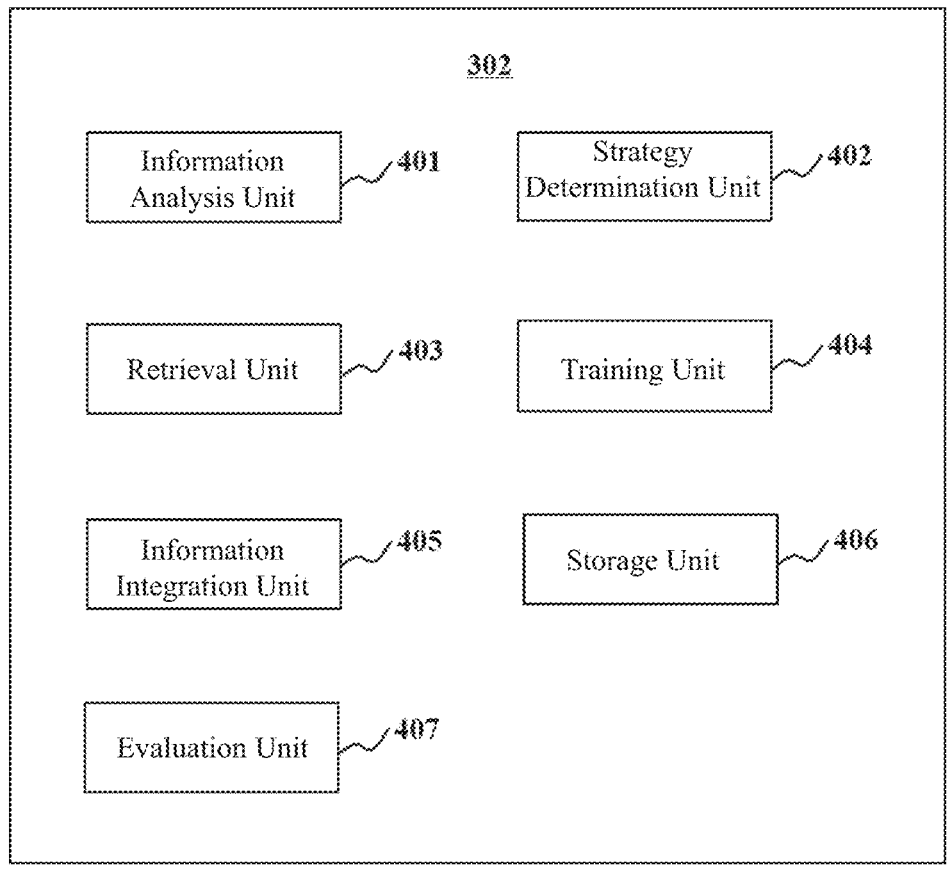
FIG. 4 is a schematic diagram of a processing module according to some embodiments of the present disclosure.

FIG. 4 is a schematic diagram of the processing module 302 according to some embodiments of the present disclosure. As shown in FIG. 4, the processing module 302 may include an information analysis unit 401, a strategy determination unit 402, a retrieval unit 403, a training unit 404, an information integration unit 405, a storage unit 406, and an evaluation unit 407. In some embodiments, the information analysis unit 401 may be configured to analyze the collected information, including but not limited to, data filtering, natural language analysis, feature extraction, classifying, ranking, determining, calculating, counting, or the like, or any combination thereof. The strategy determining unit 402 may determine a retrieval strategy (see FIG. 5) according to an analysis result of the information analysis unit 401. The retrieval strategy may be set by the user, or may be selected by the information recommendation engine 300. The retrieval unit 403 may retrieve according to the determined retrieval strategy, and obtain a related product. The training unit 404 may continuously train data, a parameter, a strategy, a module, a process to obtain personalized settings of information recommendation for different users. For example, the training unit 404 may train the retrieval strategy to obtain an optimal retrieval strategy for a user. The optimal retrieval strategy may be stored in the storage unit 406 for later use. The information integration unit 405 may further integrate the retrieved related product information to recommend to the user. An integration technique may include one or more operations, such as classifying, ranking, and merging the retrieved product information. The storage unit 406 may store information outputted by one or more units in the processing module 302. The evaluation unit 407 may evaluate the retrieved product. The evaluation content may include performance, value, revenue, risk, or the like, or any combination thereof.

Figure 5:
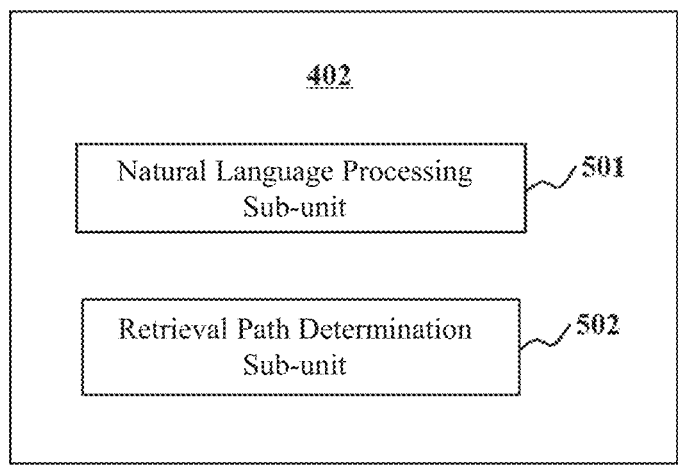
FIG. 5 is a schematic diagram of a strategy determination unit according to some embodiments of the present disclosure.

FIG. 5 is a schematic diagram of a strategy determination unit 402 according to some embodiments of the present disclosure. As shown in FIG. 5, the strategy determination unit 402 may include a natural language processing sub-unit 501 and a retrieval path determination sub-unit 502. In some embodiments, the natural language processing sub-unit 501 may include any device that enables communications between the user and a machine. The natural language processing sub-unit 501 may perform one or more operations, such as text reading, voice recognition, automatic word segmentation, part-of-speech (POS) tagging, syntactic analysis, natural language generation, text classification, information retrieval, information extraction, text proofreading, and machine translation. In some embodiments, the natural language processing sub-unit 501 may process information (e.g., text, voice, actions, pictures, etc.) inputted by the user and then extract keywords from the information. In some embodiments, the extracted keywords may be further converted to natural language for user confirmation. The retrieval path determination sub-unit 502 may determine the retrieval path based on the keywords obtained by the natural language processing sub-unit 501. The retrieval path may include finding a basic expression of one or more related products. The retrieval path may be implemented by one or more layers of retrieval algorithms. For example, the retrieval algorithm may include a Depth-First-Search (DFS), a Breadth-First-Search (BFS), etc. The retrieval path may include one path, two or more paths. The retrieval path determination sub-unit 502 may retain all of the paths, or may retain only one of the paths, such as the optimal path.

It should be noted that the above descriptions of the processing module 302 and the strategy determination unit 402 are merely provided for illustration purposes, and are not intended to limit the scope of the present disclosure. It should be understood that those skilled in the art, after understanding the working principles of the processing module, may perform modifications such as merging, decomposing, adding, reducing, recombining, etc., on the respective units without departing from the principle. For example, the processing module 302 may not include the training unit 404, the storage unit 406, or the evaluation unit 407, and the corresponding functions may be omitted or implemented by other units. For example, the information analysis unit 401 and the strategy determination unit 402 may be combined and integrated into a strategy determination unit having information analysis functions. As another example, the retrieval unit 403 and the training unit 404 may also be combined and integrated into a retrieval unit having training functions. Such variations are within the contemplation of the present disclosure.

Figure 6:
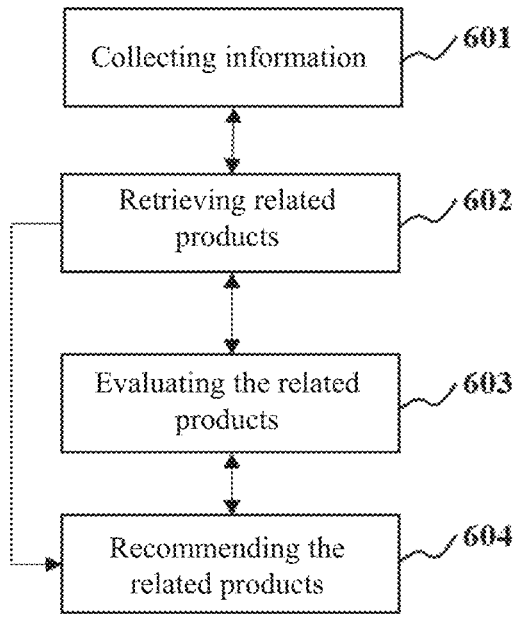
FIG. 6 is an exemplary flowchart of an information recommendation process according to some embodiments of the present disclosure.

FIG. 6 is an exemplary flowchart of an information recommendation process according to some embodiments of the present disclosure. The information recommendation process 600 may include collecting information (step 601), retrieving related products (step 602), evaluating the related products (step 603), and recommending the related products (step 604). In some embodiments, the steps in the information recommendation process 600 may be performed in sequence. Alternatively, the order of partial steps may be exchanged. For example, after performing step 602, the process may return to step 601. After performing step 603, the process may return to step 602. After performing step 604, the process may return to step 603. In some embodiments, the information recommendation process 600 may perform all of the steps. Alternatively, some of the steps may be omitted. For example, steps 601, 602, 603, and 604 may be performed sequentially. As another example, only steps 601, 602, and 604 may be implemented.

In some embodiments, in step 601, the collection module 301 may collect information. The collected information may include a user's browsing record from the terminal 103, a user's preference record, a retrieved record actively inputted by the user, or information from the information source 104. The information may be collected by the server 101 actively from various information sources. Alternatively, the terminal 103 or the information source 104 may send various information to the server 101 according to settings, and the server 101 may collect the information passively. A format of the collected information may include, but is not limited to text, picture, audio, video, or the like, or any combination thereof. The collected information may be related to various industries including, but not limited to, sport, entertainment, economic, politic, military, culture, art, science, engineering, or the like, or any combination thereof.

In some embodiments, the information collected in step 601 may include user information, records retrieved by the user, products selected by the user, other related information, and the like. The information may be divided into two categories, one category may be product related information, and the other may be user's demand information. The product related information may refer to the related information of products selected by the user. The information recommendation engine 300 may provide the recommended products or information for the user based on the products selected by the user. The user's demand information may generally refer to the user's demands for the attributes that the product or information recommended by the information recommendation engine 300 should have.

An information recommendation system for stocks may be described as an embodiment of the present disclosure. The product related information collected in step 601 may include related information of a user's optional stock. The user's optional stock may include, but is not limited to, a stock held by the user, a stock sold by the user, a stock of interest to the user, a stock collected by the user, a stock that is used by the user to simulate operation, a stock recently viewed by the users, and the like. The related information of the stocks may include, but is not limited to, company information, shareholder research, business analysis, equity structure, financial profile, dividend financing, company events, and the like. In some embodiments, more detailed secondary information may also be collected based on the related information of the stock described above. The user's demand information collected in step 601 may include a recommendation strategy selected or inputted by the user. The recommendation strategy may include, but is not limited to, a recommendation method selected or inputted by the user, an expectation for the recommended product(s) selected or inputted by the user, and the like. The recommendation method may include a method that the user expects the information recommendation engine 300 to use when the information recommendation engine 300 recommends the product(s) to the user. The recommendation method may include a retrieval method, a result ranking method, a selection method of the recommendation mode, and the like. The expectation for the recommended product(s) may include indicators that the user wishes the recommended stock to have, such as earnings per share, total equity, net assets per share, return on equity, price-to-earnings ratio, price-to-book ratio, or the like, or any combination thereof.

For example, if a user's optional stock product is an A stock. For this stock, the product related information collected by the information recommendation engine 300 may specifically include, A company's stock code, shareholder composition, recent year performance, financing situation, calendar year financial reports, company structure, research reports, announcements, and corresponding news of the A stock, etc. The user's demand information may include a recommendation expectation inputted by the user, such as "expected annualized rate of return is greater than 8%", "the probability of increase after three months is greater than 60%", "average profit after one year is greater than 7.50%", etc. The user's demand information may also include a recommendation strategy inputted by the user, such as "a stock has a similar trend with the A stock in the last quarter", "a company with major shareholders including the major shareholders of company A", "the top five companies in the tertiary industry", and the like.

Figure 7:
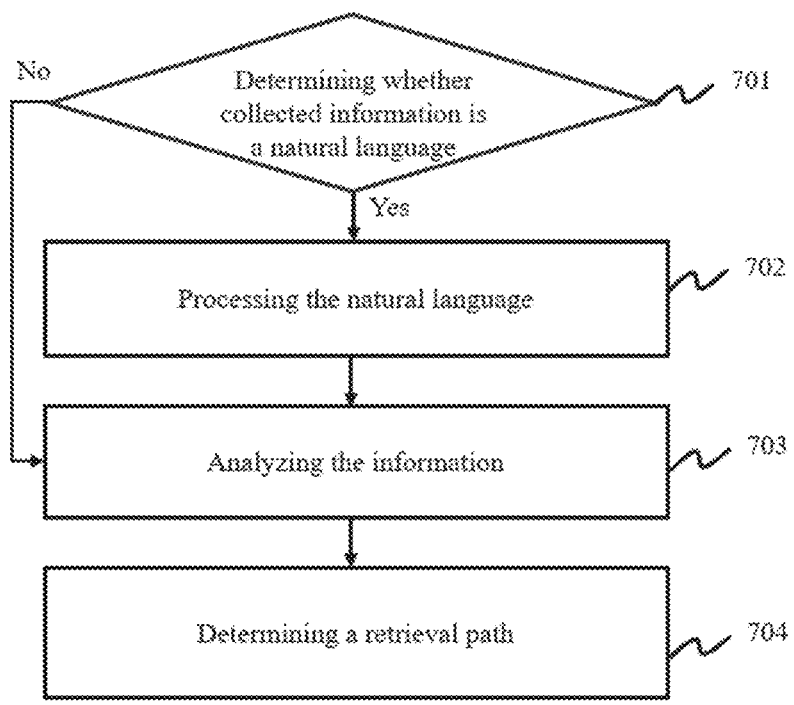
FIG. 7 is an exemplary flowchart of a retrieval process in an information recommendation process according to some embodiments of the present disclosure.

In some embodiments, in step 602, the retrieval unit 403 may retrieve related products. For example, step 602 may retrieve the related products based on the information collected in step 601. According to some embodiments of the present disclosure, step 602 may include process 700 as illustrated in FIG. 7. It should be noted that FIG. 7 is only an exemplary flowchart of an information retrieval process, and is not intended to limit the scope of the present disclosure. As shown in FIG. 7, based on the information collected in step 601, in step 701, the strategy determination unit 402 may determine whether the collected information is natural language. In response to a determination that the collected information is natural language, the process 700 may proceed to step 702. In response to a determination that the collected information is not natural language, the process 700 may proceed to step 703. As described above, the information collected in step 601 may include information actively inputted by the user. In this cases, the information may be natural language, and may need to be processed before being used by the information recommendation engine 300. If the collected information is not inputted by the user actively, but selected by the user among some options given by the system, step 702 may be skipped and step 703 may be performed.

In step 702, the natural language processing sub-unit 501 may process the natural language. The natural language may include letters, digits, characters, words, phrases, sentences, paragraphs, chapters, or the like, or any combination thereof. In some embodiments, the natural language may be a set of identifiers, which may include one or more semantics.

In step 703, the strategy determination unit 402 may analyze the information. Analyzing the information may include, but is not limited to, performing format conversion on the collected information. For example, the strategy determination unit 402 may perform text recognition on information in a format such as picture, audio, or video, and convert the information into text information. The analyzing the information may also include performing language recognition on the collected information, performing segmentation for different language. The analyzing the information may further include classifying the collected information, extracting a keyword, determining a priority, assigning a weight, and the like.

In step 704, the retrieval path determination sub-unit 502 may determine a retrieval path. The information recommendation engine 300 may determine the retrieval path based on the analyzed information described above, or based on the information specified by the user. The retrieval path may be a retrieval type. The information recommendation engine 300 may retrieve product(s) based on the retrieval type. After the retrieval path is determined, the information recommendation engine 300 may start to retrieve according to the retrieval path until the related product(s) are obtained.

A specific description of the process 700 is performed by taking an information recommendation system for stocks as an embodiment of the present disclosure. When the information collected in step 601 is the related information of the A stock and the recommendation strategy inputted by the user, such as "a similar trend to the A stock in the last quarter", "a stock with a yield greater than 6%", etc. Step 701 may be executed to determine that the recommendation strategy inputted by the user is natural language. Therefore, step 702 may be performed to process the natural language on the recommendation strategy. In step 703, the information may be analyzed. By analyzing the product related information, the A company's stock code, equity composition, recent year performances, financing situations, historical financial reports, company structure, and research reports, announcements, corresponding news of the A stock may be obtained. The user's demand information, that is, the recommendation strategy after the natural language processing, may be decomposed, to obtain keywords related to the retrieval strategy. The keywords related to the retrieval strategy may include but are not limited to "last quarter," "A," "similar trend," "yield," "greater than 6%," "stock," etc. The keywords may be classified into corresponding categories, such as a time category, an indicator category, and a commodity category, etc. In step 704, the retrieval path may be determined. The retrieval path may be divided into two. One may be a stock trend, and the other may be a yield, which may be retrieved in parallel or crossly in the retrieval process.

Returning to FIG. 6, after performing step 602 to retrieve the related products, the information recommendation engine 300 may perform step 603 to evaluate the related products. After the related products are retrieved, a matching algorithm defined by the system may be used for scoring. Alternatively, a matching algorithm defined by the user may be used for scoring. The matching degree between the retrieved related products and the user's demand may be evaluated. If the matching degree is greater than a threshold of the system, step 604 may be performed to recommend the related products. If the matching degree is less than the threshold, the process may return to step 602 to retrieve the related products again. If the matching degree of the retrieved products is still less than the threshold, the process 600 may return to step 601 to actively request the user to input new information or collect more information to enrich the retrieval terms for a second round of retrieval. In some embodiments, the threshold may be preset by the system, may be defined by the user, or may be learned by the system based on machine training.

The matching algorithm defined by the information recommendation engine 300 may include different algorithms according to different categories of the products. In some embodiments, the product recommendation may be performed according to a category of a household or personal computer. A comparison item of the matching algorithm may include, but is not limited to, an operating system, a CPU's type, a memory's capacity, a memory type, and a number of slots, a maximum support capacity, a type of a graphics card, a capacity of a graphics card, a type of an optical drive, a size of a display screen, a screen physical resolution, a screen's type, a screen display ratio, a USB interface, an audio port, a display port, a speaker, or the like, or any combination thereof. Different weights may be assigned to different items after comparing and scoring all the items, and then a total score may be obtained. Taking the information recommendation engine 300 for stocks in the process 700 as an example, after executing the process 700 (and the step 602), thousands of related products may be retrieved for the recommendation strategy (e.g., "a similar trend to the A stock in the last quarter," "a stock with a yield greater than 6%") inputted by the user. The products may not meet the user's demand, and need to be compared with the user's demand and obtain a score. The comparison items may include, but is not limited to, a time-sharing plan, a Kline chart, an annual yield rate, a rate of return on common equity (ROE), the number of shareholders, per capita tradable shares, the industry status, a back-test value of news announcements, dividend and financing conditions, or the like. Alternatively, each item may be assigned with a weight and a total score may be determined. The weight of each item may be different depending on the user's demands.

Figure 8:
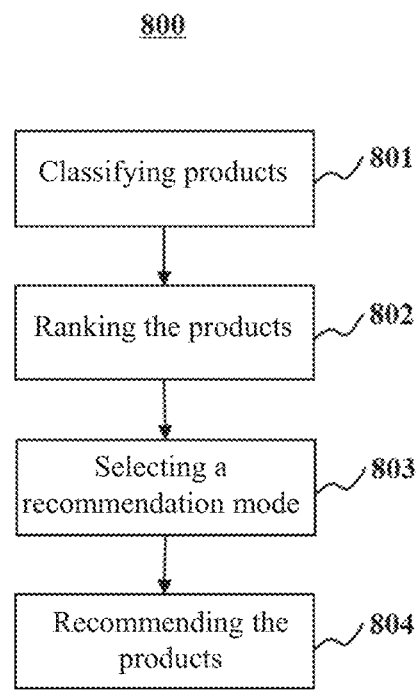
FIG. 8 is a flowchart of an exemplary recommendation process in an information recommendation process according to some embodiments of the present disclosure.

In some embodiments, in step 604, the information recommendation engine 300 may recommend the related product. The information recommendation engine 300 may recommend the related products evaluated in step 603 to the user. According to some embodiments of the present disclosure, step 604 may include process 800 as illustrated in FIG. 8. In step 801, the products may be classified. The retrieved related products may be classified into different categories. In step 802, the products may be ranked. The products in a same category among the retrieved related products may be ranked according to a matching degree, or may be ranked according to a user's preference preset by the user.

In step 803, a recommendation mode may be selected. After ranking the recommended products, the related products may be recommended to the user according to a recommendation mode preset by the user. The recommended mode may include, but is not limited to, recommending the products via a terminal message, a mobile phone short message, a mail, various social software, and the like. In step 804, the products may be recommended. Different interface services may be selected to recommend the products to the user according to the recommendation mode selected in step 803.

Returning to FIG. 6, after performing step 604 to recommend the related products, the process may return to step 603. The information recommendation engine 300 may record the products recommended to the user, search past recommendation records in the system database with similar demand(s) of similar user(s) in the history, and predict the satisfaction of the recommendation service.

In process 600, steps 601, 602, 603, and 604 may be performed sequentially, or may be performed periodically according to different situations as described above. In some embodiments, when the information collected in step 601 is relatively monotonous, such as the user's demand may be relatively simple, after performing step 602 to retrieve the related products, step 603 may be skipped and step 604 may be directly performed to recommend the related products to the user. In some embodiments, when the evaluation result of the retrieved related products does not satisfy the threshold in step 603, it may return to step 602 to perform re-determination the retrieval path for further retrieval, or may return to step 601 to collect more information. In some embodiments, after recommending the related products to the user in step 604, it may return to step 603 to perform a back-test or prediction process in the evaluation, and then recommend the predicted or back-tested result of the related products to the user.

Figure 9:
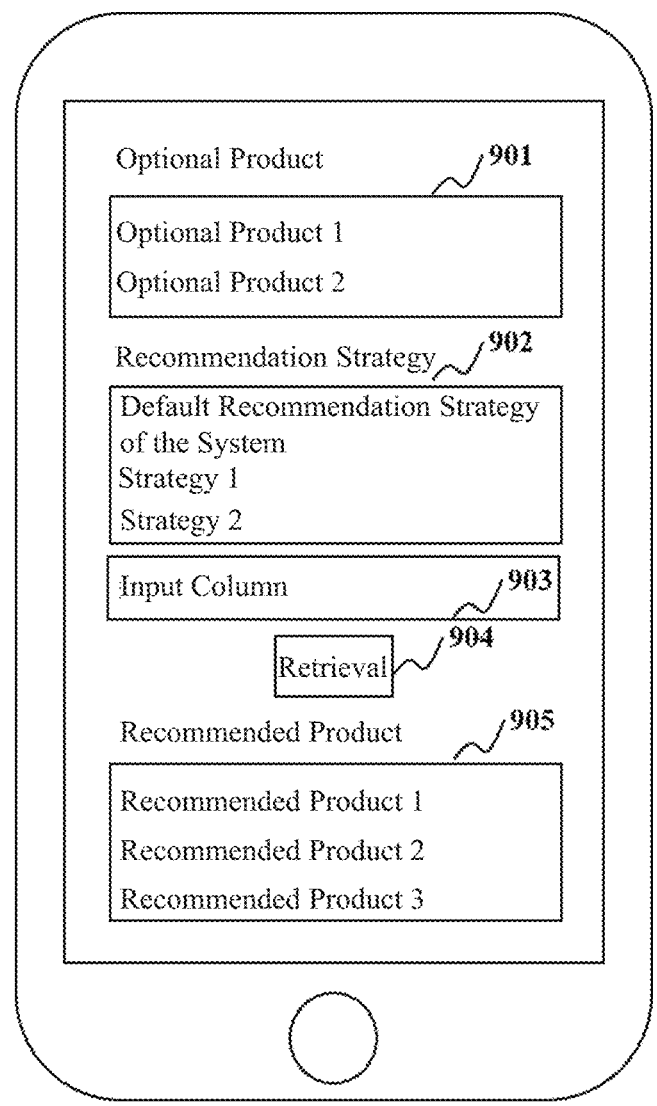
FIG. 9 is a schematic diagram of a user interaction interface of an information recommendation system according to some embodiments of the present disclosure.

FIG. 9 is a schematic diagram of a user interaction interface of the information service system described in the present disclosure. The user interaction interface may serve as a terminal such that the user 103 may interact with the server 101. The user interaction interface may be displayed on a plurality of display devices. The display devices may include, but are not limited to, a mobile phone, a personal computer, a tablet, a FDA, a smart watch, a smart home, a smart vehicle, or the like, or any combination thereof. The interactive interface may be only an embodiment of the present disclosure and is not intended to limit the scope of the present disclosure.

In some embodiments, the product selected by the user may be displayed in the optional product column 901. The product may be actively added by the user, or may be a product browsed by the user. An information recommendation system for stocks may be taken as an embodiment of the present disclosure. The optional product may be a user's optional stock, including but not limited to a stock held by the user, a stock sold by the user, a stock of interest to the user, a stock that is used by users to simulate stocks, a stock that is recently viewed by the user, and the like, In some embodiments, a plurality of recommendation strategies may be displayed and selected in a recommendation strategy column 902. The recommendation strategy may refer to a recommendation logic or recommendation method adopted by the system when recommending related products to the user according to the user's optional product. The user may select the default recommendation strategy of the system, or select different strategies with the default recommendation, the user may also input a self-defined recommendation strategy in the input column 903. An information recommendation system for stocks may be taken as an embodiment of the present disclosure. The recommendation strategy may be based on market indicators, K-line charts, financial indicators, market valuations, market research reports, shareholder(s) of the optional stock, a fund manager of the optional stock, historical performance of the stock, a recommendation strategy of a securities analyst, etc. The user may input any natural language, such as "stocks with more than 25% earnings in the last three months" when defining the recommendation strategy. The inputted natural language may include number and date in any format, such as five percent, 5-10%, ⅓, two weeks ago, last quarter last N trading days, and the like.

After selecting a certain product and a certain recommendation strategy, the user may click a retrieval button 904. The information service system may retrieve the related products according to the users selection. In some embodiments, the products recommended by the information service system to the user may be displayed in the recommended product column 905. The recommended products may be ranked in an alphabetical order, or may be ranked according to the users demand, or may be displayed in a user-defined order. The information recommendation system for stocks may be taken as an embodiment of the present disclosure. The recommended products may be ranked according to the relevance degree of shareholder(s), or may be ranked according to the expected annualized rate of return, or may be ranked according to the annual cumulative earnings, and the like. In some embodiments, in the recommended product column 905, or after clicking a product in the recommended product column 905, a description, reason or analysis of the information service system recommendation for the product may be displayed for the user's reference.

The above descriptions may outline different aspects of the information recommendation process and/or process for implementing other steps through a program. The program in the present disclosure may be considered as "products" or "artifacts" presented in the form of executable codes and/or related data. The program may be joined or implemented by a computer-readable medium. A tangible and non-volatile storage medium may include memory or storage that is applied in any computer, processor, similar devices, or relative modules. For example, the memory or storage may include various types of semiconductor storages, tape drives, disc drives, or similar devices providing storage functions to software at any time.

All or part of software may communicate via a network, such as the Internet or other communication networks. The communication may load software from a computer device or a processor to another. For example, software may be loaded from a management server or a main computer of the on-demand service system to a hardware platform in a computer environment, or to other computer environments implementing the system, or to systems with similar functions of providing information required by on-demand service. Correspondingly, another medium capable of transmitting software elements may be used as physical connections between local devices. For example, light waves, electric waves, electromagnetic waves, etc., may be transmitted by cables, optical cables or air. Physical media used to carry waves, such as cables, wireless connection, optical cables, etc., may also be considered as media of hosting software. Herein, unless the tangible "storage" medium is particularly designated, other terminologies representing the "readable medium" of a computer or a machine may represent a medium participated when the processor executes any instruction.

A computer-readable medium may have many forms that may include but are not limited to a tangible storage medium, a carrier wave medium, or a physical transmission medium. A stable storage medium may include a compact disc, a magnetic disk, or storage systems that are applied in other computers or similar devices and may achieve all the sections of the system described in the drawings. An unstable storage medium may include a dynamic memory, e.g. the main memory of the computer platform. The tangible transmission medium may include a coaxial cable, a copper cable and an optical fiber, and circuits forming the bus in the internal of the computer system. The carrier wave medium may transmit electric signals, electromagnetic signals, acoustic signals or light wave signals, which may be generated by radio frequency communication or infrared data communication. General computer readable media may include a hard disk, a floppy disk, a magnetic tape, or any other magnetic media; a CD-ROM, a DVD, a DVD-ROM, or any other optical media; a punched card, or any other physical storage media including a aperture mode; a RAM, a PROM, an EPROM, a FLASH-EPROM, or any other memory chip or magnetic tape; carrier waves used to transmit data or instructions, cables or connection devices used to transmit the carrier waves, or any other program code and/or data accessible to a computer. Most of the computer readable media may be applied in executing instructions or transmitting one or more results by the processor.

It may be understood to those skilled in the art that various alterations and improvements may be achieved according to some embodiments of the present disclosure. For example, the components of the system described above may be implemented by hardware, or may be implemented by software. For example, a system may be installed on the existing server. Additionally or alternatively, the location information disclosed herein may be provided by firmware, a combination of firmware and software, a combination of firmware and hardware, or a combination of firmware, hardware and software.

The present disclosure and/or some embodiments have been described above. According to the descriptions above, various alterations may be achieved. The topic of the present disclosure may be achieved in various forms and embodiments, and the present disclosure may be further used in a variety of application programs. All applications, modifications and alterations required to be protected in the claims may be within the protection scope of the present disclosure.

What is claimed is:

1. A method for information recommendation, implemented on a computing device having at least one processor, at least one communication network, and at least one computer-readable storage medium, comprising:
    performing an iteration process including at least one iteration, wherein each of the at least one iteration comprises:

obtaining, via a network, information selected by a user through a terminal and information retrieved by the user through the terminal;

analyzing the selected information and the retrieved information;

determining a retrieval path based on a result of analyzing the selected information and the retrieved information, wherein the retrieval path includes one or more paths of finding a basic expression of related information, and each path includes one or more layers of retrieval algorithms;

retrieving, based on the retrieval path, other information, wherein the other information includes product related information that is retrieved, based on user's demand information, from both the selected information and the retrieved information; and the user's demand information includes a recommendation expectation inputted by the user or a recommendation strategy inputted by the user;

determining an evaluation value according to the other information;

comparing the evaluation value with a threshold;

back-testing the other information; and in response to a determination that the evaluation value is not less than the threshold, recommending the other information to the user by sending the other information, via the network, to be displayed on a user interaction interface on the terminal.

2. The method of claim 1, wherein the information selected by the user includes securities information, including at least one of securities information held by the user, securities information sold by the user, securities information of interest to the user, securities information collected by the user, or securities information that is used by the user to simulate an operation.

3. The method of claim 1, wherein analyzing the selected information or the retrieved information further comprises:

determining whether the selected information or the retrieved information is natural language; and in response to a determination that the selected information or the retrieved information is natural language, analyzing the natural language.

4. The method of claim 1, wherein analyzing the selected information or the retrieved information comprises at least one of classifying the information, extracting a keyword, determining a priority, or assigning a weight.

5. The method of claim 1, wherein determining an evaluation value according to the other information further comprises:

determining a matching degree between the other information and the user's demand information using a matching algorithm.

6. The method of claim 1, wherein recommending the other information to the user further comprises:

classifying the other information; and sending at least one portion of a classification result to the user.

7. The method of claim 1, wherein the method further comprises performing a machine training on the retrieval path.

8. A system for information recommendation, comprising:

a computer-readable storage medium;

codes stored in the computer-readable storage medium; and a processor, when executing the codes, the processor is configured to perform operations comprising:

performing an iteration process including at least one iteration, wherein each of the at least one iteration comprises:

obtaining, via a network, information selected by a user through a terminal and information retrieved by the user through the terminal;

analyzing the selected information and the retrieved information;

determining a retrieval path based on a result of analyzing the selected information and the retrieved information, wherein the retrieval path includes one or more paths of finding a basic expression of related information, and each path includes one or more layers of retrieval algorithms;

retrieving, based on the retrieval path, other information, wherein the other information includes product related information that is retrieved, based on user's demand information, from both the selected information and the retrieved information; and the user's demand information includes a recommendation expectation inputted by the user or a recommendation strategy inputted by the user;

determining an evaluation value according to the other information;

comparing the evaluation value with a threshold;

back-testing the other information; and in response to a determination that the evaluation value is not less than the threshold, recommending the other information to the user by sending the other information, via the network, to be displayed on a user interaction interface on the terminal.

9. The system of claim 8, wherein the system further comprises a terminal, the terminal performing one or more operations including:

sending the information selected by the user or information retrieved by the user to the system; and receiving the other information related to the selected information recommended by the system according to the selected information or the retrieved information.

10. The system of claim 8, wherein the terminal is configured to display the other information.

11. The system of claim 8, wherein the information selected by the user includes securities information including at least one of securities information held by the user, securities information sold by the user, securities information of interest to the user, securities information collected by the user, or securities information that is used by the user to simulate an operation.

12. The system of claim 8, wherein analyzing the selected information or the retrieved information further comprises:

determining whether the selected information or the retrieved information is natural language; and in response to a determination that the selected information or the retrieved information is natural language, analyzing the natural language.

13. The system of claim 8, wherein analyzing the selected information or the retrieved information comprises at least one of classifying the information, extracting a keyword, determining a priority, or assigning a weight.

14. The system of claim 8, wherein determining an evaluation value according to the other information further comprises:

determining a matching degree between the other information and the user's demand information using a matching algorithm.

15. The system of claim 8, wherein recommending the other information to the user further comprises:
   classifying the other information; and
   sending at least one portion of a classification result to the user.

16. A non-transitory computer readable medium comprising a set of instructions, wherein when executed by at least one processor, cause the at least one processor to effect a method for information recommendation, comprising:
   performing an iteration process including at least one iteration, wherein each of the at least one iteration comprises:
      obtaining, via a network, information selected by a user through a terminal and information retrieved by the user through the terminal;
      analyzing the selected information and the retrieved information;
      determining a retrieval path based on a result of analyzing the selected information and the retrieved information, wherein the retrieval path includes one or more paths of finding a basic expression of related information, and each path includes one or more layers of retrieval algorithms;
      retrieving, based on the retrieval path, other information, wherein
         the other information includes product related information that is retrieved, based on user's demand information, from both the selected information and the retrieved information; and
         the user's demand information includes a recommendation expectation inputted by the user or a recommendation strategy inputted by the user;
      determining an evaluation value according to the other information;
      comparing the evaluation value with a threshold;
      back-testing the other information; and
      in response to a determination that the evaluation value is not less than the threshold, recommending the other information to the user by sending the other information, via the network, to be displayed on a user interaction interface on the terminal.

* * * * *